United States Patent
Udupi et al.

(10) Patent No.: US 9,769,084 B2
(45) Date of Patent: Sep. 19, 2017

(54) OPTIMIZING PLACEMENT OF VIRTUAL MACHINES

(71) Applicant: Cisco Technology, Inc., San Jose, CA (US)

(72) Inventors: Yathiraj B. Udupi, San Jose, CA (US); Debojyoti Dutta, Santa Clara, CA (US); Madhav V. Marathe, Cupertino, CA (US); Raghunath O. Nambiar, San Ramon, CA (US)

(73) Assignee: Cisco Technology, San Jose, CA (US)

( * ) Notice: Subject to any disclaimer, the term of this patent is extended or adjusted under 35 U.S.C. 154(b) by 175 days.

(21) Appl. No.: 14/242,131

(22) Filed: Apr. 1, 2014

(65) Prior Publication Data

US 2015/0127834 A1 May 7, 2015

Related U.S. Application Data

(60) Provisional application No. 61/899,184, filed on Nov. 2, 2013.

(51) Int. Cl.
*G06F 15/173* (2006.01)
*H04L 12/911* (2013.01)
*G06F 9/50* (2006.01)

(52) U.S. Cl.
CPC ............ *H04L 47/78* (2013.01); *G06F 9/5044* (2013.01)

(58) Field of Classification Search
USPC ................. 709/226, 220, 223, 224
See application file for complete search history.

(56) References Cited

U.S. PATENT DOCUMENTS

| | | | | | |
|---|---|---|---|---|---|
| 2013/0268672 | A1* | 10/2013 | Justafort | ................. | H04L 67/10 709/226 |
| 2014/0143401 | A1* | 5/2014 | Carlen | .................. | G06F 9/5072 709/223 |
| 2014/0201371 | A1* | 7/2014 | Gupta | ................. | G06F 9/45558 709/226 |
| 2014/0380307 | A1* | 12/2014 | Zhu | ..................... | G06F 9/45533 718/1 |

OTHER PUBLICATIONS

Korupolu, Madhukar et al., "Coupled Placement in Modern Data Centers," IBM Almaden Research Center, San Jose, CA, USA, IEEE IPDPS 2009.

Jiang, Joe Wenjie et al., "Joint VM Placement and Routing for Data Center Traffic Engineering," INFOCOM, p. 2876-2880, IEEE, 2012.

Meng, Ziaoquao et al., "Improving the Scalability of Data Center Networks with Traffic-aware Virtual Machine Placement," INFOCOM, 2010 Proceedings IEEE.

* cited by examiner

*Primary Examiner* — Lan-Dai T Truong
(74) *Attorney, Agent, or Firm* — Polsinelli PC

(57) ABSTRACT

Systems and methods are described for allocating resources in a cloud computing environment. The method includes receiving a computing request, the request for use of at least one virtual machine and a portion of memory. In response to the request, a plurality of hosts is identified and a cost function is formulated using at least a portion of those hosts. Based on the cost function, at least one host that is capable of hosting the virtual machine and memory is selected.

12 Claims, 4 Drawing Sheets

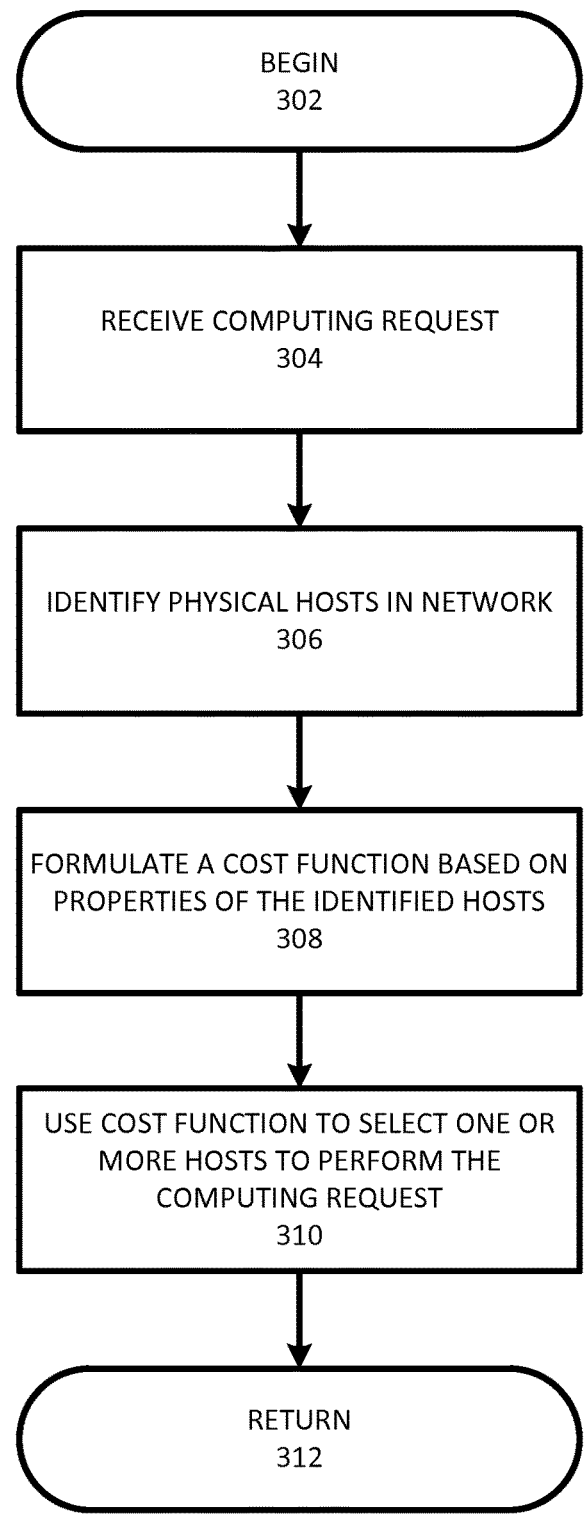

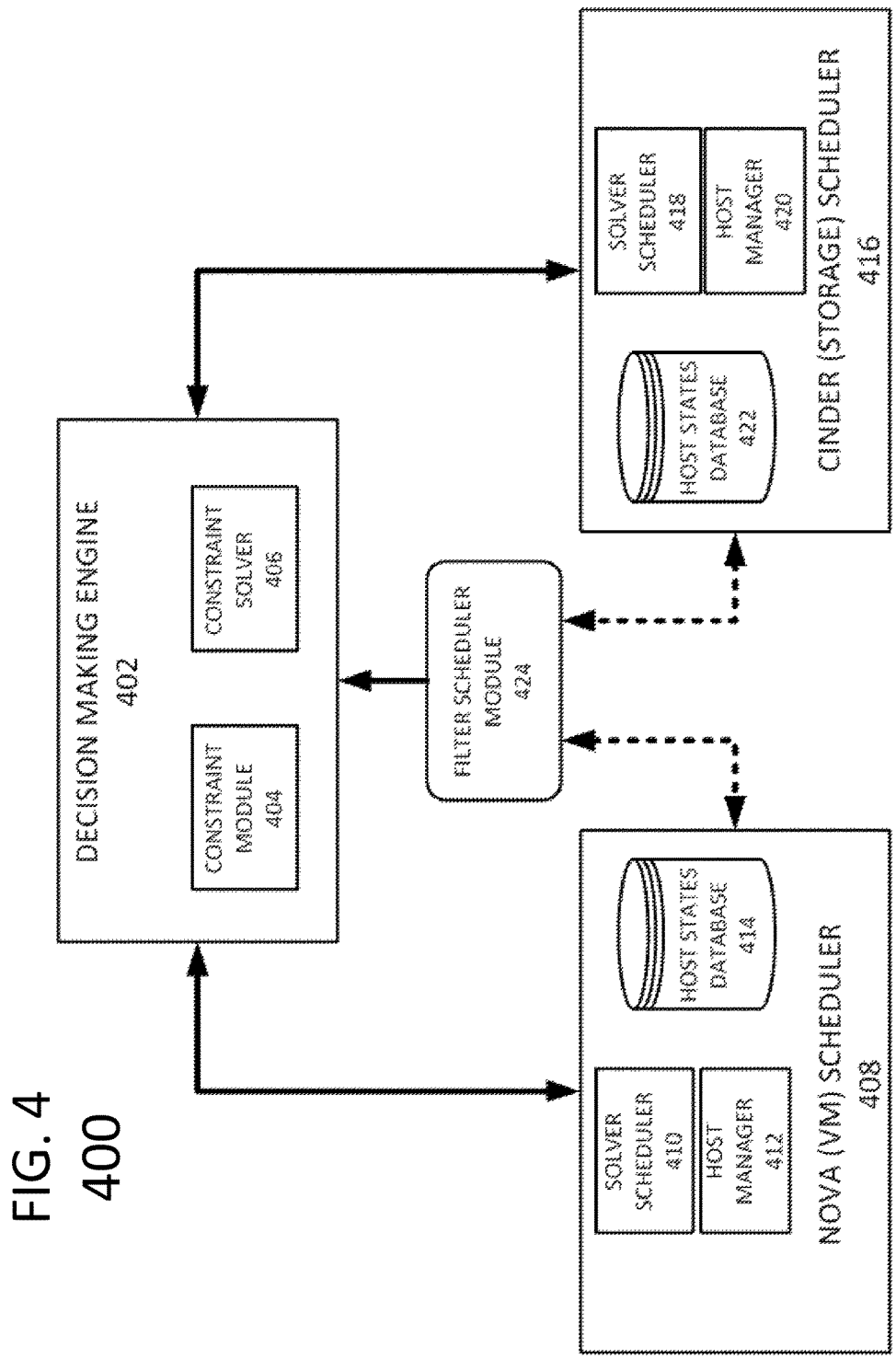

OPTIMIZING PLACEMENT OF VIRTUAL MACHINES

CROSS-REFERENCE TO RELATED APPLICATION

This application claims priority to U.S. Provisional Application 61/899,184, filed Nov. 2, 2013, the complete disclosure of which is incorporated herein by reference in its entirety.

TECHNICAL FIELD

This disclosure relates in general to the field of computer systems and, more particularly, to optimizing placement of virtual machines in a cloud computing environment.

BACKGROUND

Computer networking technology allows execution of complicated computing tasks by sharing the work among the various hardware resources within the network. This resource sharing facilitates computing tasks that were previously too burdensome or impracticable to complete. For example, the term "big data" has been used to describe data sets that are extremely large and complex, making them difficult to process. Many of the systems for analyzing these datasets require a sophisticated network of machines to store and process the data. Consequently, many of the solutions that target big data workloads rely on shared network resources in the form of virtual machines in a cloud computing environment.

In order to efficiently manage the sharing of these complex computing tasks, available network resources should be intelligently allocated and hosts selected that are able to perform the computing task. Consequently, there is a need to logically select the hosts for the virtual machines such that the utilization of the network resources is maximized while minimizing the cost.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which:

FIG. 3 illustrates an example method utilizing the present disclosure; and

FIG. 4 illustrates an example system configuration for the decision making engine utilizing the present disclosure.

DESCRIPTION OF EXAMPLE EMBODIMENTS

Figure 1:
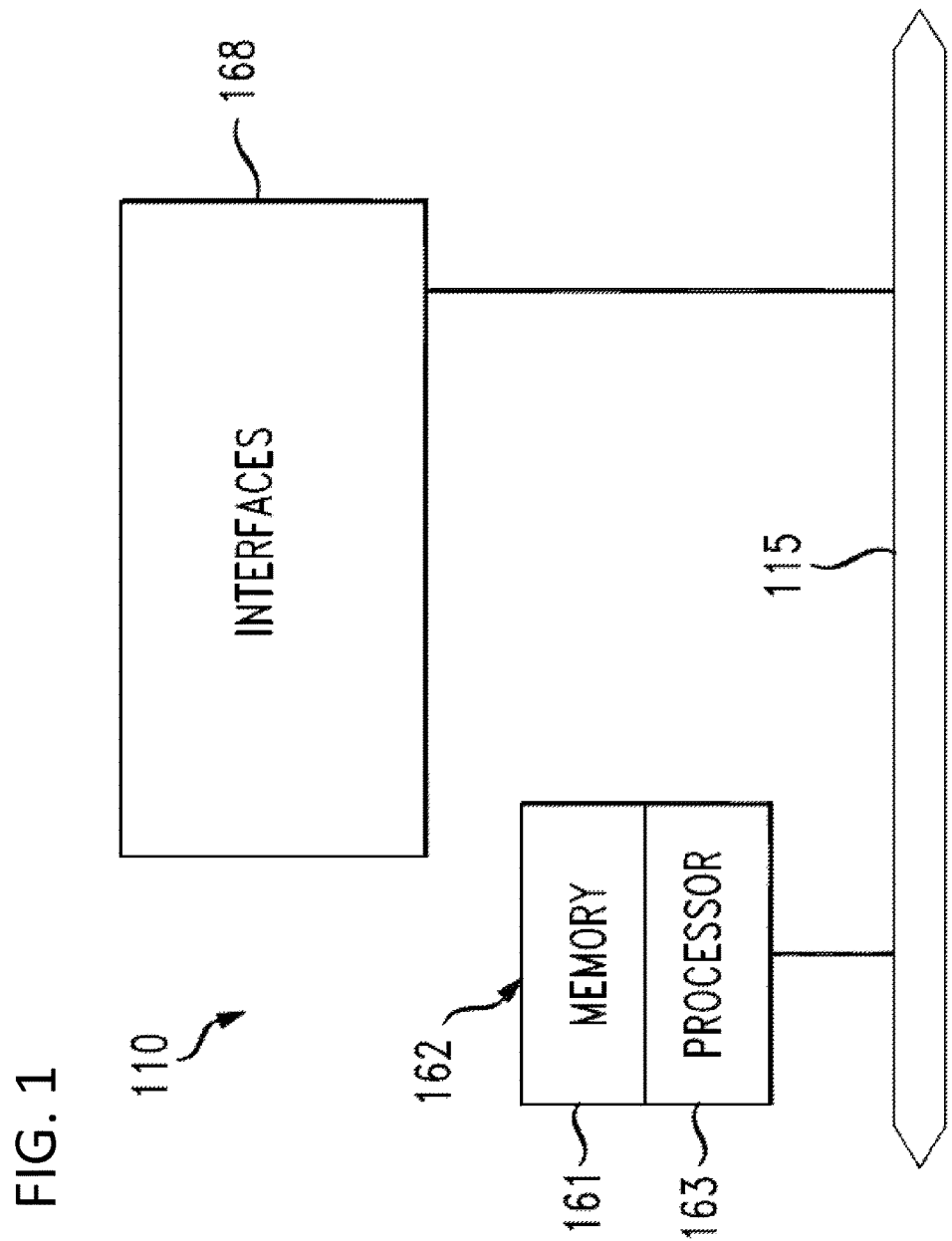
FIG. 1 illustrates an example network device utilizing the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

The present disclosure describes a mechanism for finding optimal placements of virtual machines (compute nodes) and memory (block storage volumes) in the available physical servers (hosts) in a cloud deployment of datacenters. As used herein, "memory" refers to both volatile and non-volatile storage mediums such as RAM, Flash, EEPROM, Hard Disks, and any other technology that can be used to store electronic data. Optimal placements signify a solution that minimizes a set of cost metrics such as the network cost, measured in terms of metrics such as network distance/hops, latency, bandwidth, task completion times, host utilization, etc. The optimal placement when targeting complex computing tasks is to collocate virtual machines and storage volumes on the same physical hosts. This placement is preferred because of the large number of reads and writes between the virtual machine and storage unit. However, if a physical host cannot accommodate both the storage volume and the virtual machine (VM), then an alternative solution can be selected according to the cost.

Overview:

In one aspect of the present disclosure, a method for allocating resources in a cloud computing environment is disclosed. The method includes receiving a computing request for use of at least one virtual machine and a portion of memory. In response to the request, a plurality of hosts is identified and a cost function using at least a portion of the identified plurality of hosts is formulated. Based on the cost function, at least one host that is capable of hosting the virtual machine and the memory is selected.

In another aspect, a decision making engine for allocating network resources in a cloud computing environment is disclosed. The decision making engine includes a processor and a memory where the memory has computer-executable instructions that, when executed on the processor, cause the processor to receive at least one computing request for the use of at least one virtual machine and a portion of memory. In response to the request, a plurality of hosts is identified and a cost function using at least a portion of the plurality of hosts is formulated. Based on the cost function, at least one host from the portion of the plurality of hosts that is capable of hosting the virtual machine and the memory is selected.

In yet another aspect, a system for allocating resources in a cloud computing environment is disclosed. The system includes a first module for scheduling virtual machines, a second module for scheduling block storage and a decision making engine. The decision making engine is adapted to receive a computing request for at least one virtual machine from the first module and to receive a storage request for use of a portion of memory from the second module. The decision making engine is further adapted to identify a plurality of hosts in the cloud computing environment and formulate a cost function using at least a portion of those hosts. Based on the cost function, the decision making engine selects at least one host that is capable of hosting the virtual machine and the memory.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Prior to discussing the present technology in detail, a brief introductory description of an exemplary network device and an exemplary system are disclosed herein. A detailed description of the various aspects of the present technology will then follow. These variations shall be described herein as the various examples are set forth.

FIG. 1 illustrates an exemplary network device 110 suitable for implementing the present disclosure. Network device 110 includes a master central processing unit (CPU) 162, interfaces 168, and a bus 115 (e.g., a PCI bus). When acting under the control of appropriate software or firmware, CPU 162 can perform as a decision making engine in a network computing environment. The decision making engine responds to computing requests by identifying network resources available for the requested task and allocating appropriate resources to host the required virtual machines and provide necessary data storage. The decision making engine allocates the available resources such that their utilization is optimized.

CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of network device 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with network device 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, Asynchronous Transfer Mode (ATM) interfaces, High-Speed Serial Interfaces (HSSI), Packet-Over-SONET/SDH (POS) interfaces, Fiber Distributed Data Interfaces (FDDI) and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 162 to efficiently perform optimization computations required by the decision making engine.

Although the system shown in FIG. 1 is one specific network device of the present disclosure, it is by no means the only network device architecture on which the present disclosure can be implemented. For example, an architecture having a single processor that handles communications as well as computations, etc. is often used. Further, other types of interfaces and media could also be used with the network device 110.

Regardless of the configuration of network device 110, it may employ one or more memories or memory modules (including memory 161) configured to store program instructions for the network operations and functions described herein. The program instructions may control the operation of an operating system and/or one or more applications. Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

In one example implementation, network device 110 can include memory 161 for storing information to be used in achieving the optimization and/or placement procedures, as discussed herein. Additionally, any of the components described herein may include instances of one or more processors that can execute software or an algorithm to perform the optimization and/or placement procedures, as disclosed in this Specification. These devices may further keep information (e.g., variables) in any suitable memory element [e.g., random access memory (RAM), ROM, EPROM, EEPROM, ASIC, etc.], software, hardware, or in any other suitable component, device, element, or object where appropriate and based on particular needs. Any of the memory items discussed herein (e.g., database, tables, trees, cache, etc.) should be construed as being encompassed within the broad term "memory element."

Figure 2:
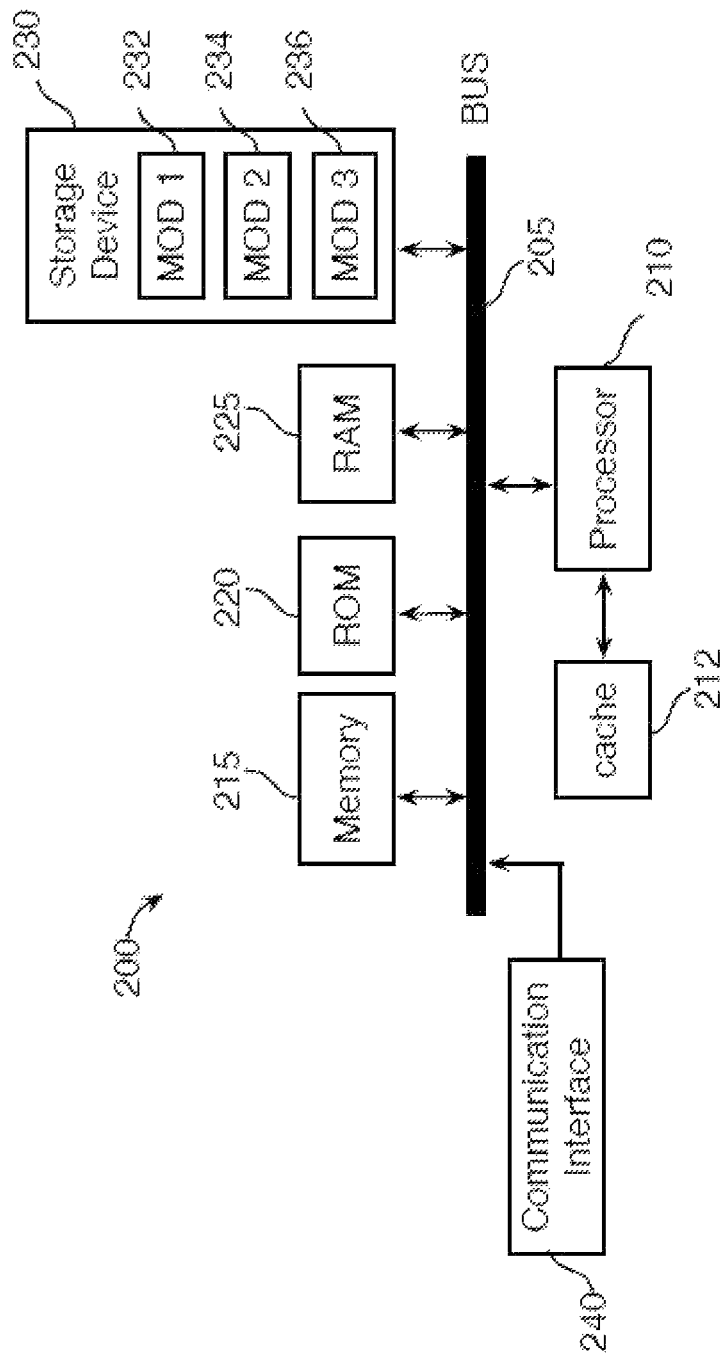
FIG. 2 illustrates an example system architecture utilizing the present disclosure.

FIG. 2 illustrates exemplary systems utilizing the present disclosure, such a system making up network device 110. The more appropriate example will be apparent to those of ordinary skill in the art when practicing the present technology. Persons of ordinary skill in the art will also readily appreciate that other system examples are possible.

FIG. 2 illustrates an example system computing architecture 200 wherein the components of the system are in electrical communication with each other using a bus 205. System 200 includes a processing unit (CPU or processor) 210 and a system bus 205 that couples various system components including the system memory 215, such as read only memory (ROM) 220 and random access memory (RAM) 225, to the processor 210. System 200 can include a cache of high-speed memory connected directly with, in close proximity to, or integrated as part of processor 210. System 200 can copy data from memory 215 and/or storage device 230 to the cache 212 for quick access by processor 210. In this way, cache 212 can provide a performance boost that avoids processor 210 delays while waiting for data. These and other modules can control or be configured to control processor 210 to perform various actions. Other system memory 215 may be available for use as well. Memory 215 can include multiple different types of memory with different performance characteristics. Processor 210 can include any general purpose processor and a hardware module or software module, such as module 1 (MOD 1) 232, module 2 (MOD 2) 234, and module 3 (MOD 3) 236 stored in storage device 230, configured to control processor 210 as well as a special-purpose processor where software instructions are incorporated into the actual processor design. Processor 210 may essentially be a completely self-contained computing system, containing multiple cores or processors, a bus, memory controller, cache, etc. A multi-core processor may be symmetric or asymmetric.

The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

Storage device 230 can include software modules 232, 234, 236 for controlling processor 210. Other hardware or software modules are contemplated. Storage device 230 can be connected to system bus 205. In one aspect, a hardware module that performs a particular function can include the software component stored in a computer-readable medium in connection with the necessary hardware components, such as processor 210, bus 205, display 235, and so forth, to carry out the function.

Turning now to FIG. 3, an operation of the placement optimization of virtual machines will be discussed in greater detail. FIG. 3 is a flowchart of steps in an exemplary method 300 for optimizing the placement of virtual machines. Method 300 begins at step 302 and continues to step 304. At step 304, the decision making engine receives a computing request for the use of at least one virtual machine (VM) and for the use of some amount of physical storage (i.e. memory) as a data/storage volume. In one example, the computing request can be represented in vector form as follows:

$V=\{VM_1, VM_2, \ldots VM_n\}$—'n' number of VMs requested $S=\{S_1, S_2, \ldots S_n\}$—'n' number of Storage Volumes requested For simplicity and illustration, this example shows an equivalent number 'n' of VMs and Storage Volumes. However, the number of Storage Volumes needed may be smaller or greater than the number of VMs.

In addition to the request for a VM and memory, the computing request can also incorporate a number of additional requirements that may be viewed as demand constraints. For example, each computing request for a VM may also include a required set of computing requirements in terms of, e.g., number of CPUs, RAM, internal disk storage, processing speed, cache, and other capability requirements. Thus, each VM can be associated with one or more demand vectors for computing related resources:

$\{Ri_1, Ri_2, \ldots, Ri_d\}$, where $Ri_k$ is a demand of Resource 'k'

$\{RV_i\}$, corresponding to a demand of storage volume size for $VM_i$

Furthermore, the computing request for the use of physical storage can further specify requirements such as the amount of memory required for the data volume as well as the access speed requirements for the physical storage. In some instances, the computing request may also add a constraint that ensures the selected VM host has sufficient disk space to host both the VM and the data volume. This constraint requires the addition of the required disk space specified as part of the computing requirement to the data volume requirement. In this example, the decision making engine can place VMs on only those hosts that also have sufficient disk space to host the data volume. This becomes a hard constraint forcing collocation of the VM and the storage volume. However, the decision making engine may report when there is no host to satisfy this constraint, and it may propose the next best alternative placement.

In another example, a constraint may ensure that a virtual machine is assigned to only one host. In a further example, a constraint may ensure that a block storage volume is assigned to only one host. In yet a further example, the computing request may specify a location for block storage volume. For instance, the data that requires processing may already be available and stored on a particular server, and the processing request may specify that the virtual machine must communicate with that server to access the data, rather than copying it to another location.

Returning to method 300 of FIG. 3, after the decision making engine receives the computing request at step 304 it identifies physical hosts in the network, at step 306. The hosts identified can include different types of hardware such as a server that has computing capability that allows it to host a VM. The decision making engine can also identify hosts that are standalone storage servers and do not have the capability to host a VM. The identified hosts can be represented in vector format as follows:

$H=\{H_1, H_2, \ldots H_m\}$—'m' Hosts available

For each host it identifies, the decision making engine can gather information on the relevant properties of the identified host. In one example, these properties can be maintained in the form of a supply vector that is associated with the particular host. The supply vector can contain data regarding the identified host's computing capabilities (CPUs, RAM, CACHE), available storage space, location within the network, utilization, etc. Furthermore, the decision making engine can gather the host properties by accessing a table or record in its memory, by querying the device, or by communicating with any other hardware within the network. Example notations for the corresponding supply vectors are shown below.

Each HOSTi can have a supply vector of the form for compute resources:
$\{SPi1, SPi2, \ldots SPid\}$, SPik is a supply of Resource 'k'

Each HOSTi can have a supply of storage space for volumes:
$\{SPVi\}$

Once the hosts are identified 306, the decision making engine can formulate a cost function 308 by using the various properties of the identified hosts. The cost function establishes a relationship between the identified hosts and the unassigned VMs or Volume Storage units. In one example, the cost function is established based on the network topology, and more specifically, on the network hop distance between the physical hosts. In other possible examples, the cost function can be enhanced by considering different metrics related to network costs or other compute/storage related metrics. In this fashion, the decision making engine can use the cost function to optimize resource allocation based on any relevant metric. To take a plurality of cost metrics into account, the cost function can employ a matrix that includes a weighted sum of all the cost metrics to arrive at a cost matrix. An example is of the form:

[#*H*1, *H*2, *H*3
[0, 1, 3], #*H*1
[1, 0, 4], #*H*2
[3, 4, 0]#*H*3
]

After the cost function is established 308, the decision making engine can perform 310 the necessary calculations to solve the function and assign one or more of the identified hosts to perform the computing request. In one example, the decision making engine can perform the calculation by using the cost function along with the supply and constraint vectors to formulate a linear programming problem. According to one aspect, the linear program comprises one or more sets of variables. One example set of variables is provided for the first assignment problem, where the assignment of virtual machines to physical hosts is represented by a set of binary variables having values 0 or 1. For instance, if a given virtual machine is assigned to a particular host, the variable corresponding to that given virtual machine and the particular host may have a value 1, otherwise 0.

Assigning VMs to Hosts:
{Set of $Vi\_Hj$}—the variable $Vi\_Hj$ takes values 0 or 1, indicating
$VM\_i$ is assigned for $Host\_j$ when the value is 1, otherwise 0

Another example set of variables is provided for a second assignment problem, where the assignment of block storage volumes to physical hosts is represented by a set of binary variables having values 0 or 1. For instance, if a given block storage volume is assigned to a particular host, the variable corresponding to that given block storage volume and the particular host may have a value 1, otherwise 0.

Assigning storage volumes to Hosts:
{Set of $Si\_Hj$}—the variable $Si\_Hj$ takes values 0 or 1, indicating
Storage $Volume\_i$ is created on $Host\_j$ when the value is 1, otherwise 0

Continuing with this example, the variables can be used to set up a linear cost function according to the potential host assignments. If $Hj$ and $Hk$ are the hosts chosen for VM $Vi$ and Storage Volume $Si$ respectively, the distance between $Hj$ and $Hk$ can be multiplied by variables $Vi\_Hj$ and $Si\_Hk$. This is repeated for the VMs requested. According to one aspect, the examples include minimizing this linear cost function such that the network hop distance is reduced while also satisfying the supply and demand constraints.

Sum ($Vi\_Hj$*distance($Hj$, $Hk$)+$Si\_Hk$*distance($Hj$, $Hk$)) for all i in 1, . . . n, for all $Hj$ in H, for all $Hk$ in H, such that $Vi\_Hj$ and $Si\_Hk$ are both 1.

Recall that demand constraints were identified as part of the computing request in 304 and the supply constraints are based on the identified hosts 306 in the network. Accordingly, for each Host $Hi$, and for each resource type $Rk$, the decision making engine may add a compute supply constraint as follows:

Sum ($Vj\_Hi$*$Rk$ for every $Vj$ in V)<=$SPik$,
Similarly, for the storage constraint, for each host $Hi$:
Sum ($Sj\_Hi$*$RVj$ for every $Sj$ in S)<=$SPVi$ Further examples of constraints include requiring a VM to be tied to only one host. For every $Vi$ in V, the following constraint can be included:

Sum($Vi\_Hj$ for every $Hj$ in H)==1//ensures only one $Vi\_Hj$ is equal to all Hosts in H.

Likewise, a constraint can require having one storage volume per host:

Sum($Si\_Hj$ for every $Hj$ in H)==1//ensures one volume can be tied to only one Host.

Accordingly, any remaining parameters that were received as part of the computing request 304 can be expressed as a constraint in the appropriate mathematical form. The solution to the linear programming problem can be found by minimizing the cost function in view of the constraints. The solution results in placement decisions that satisfy the parameters of the computing request received 304. Each requested VM will be provisioned in some physical host, and the requested memory (block storage volume) will be created in some physical host that has the required capacity.

Turning back to method 300, after the cost function is solved and the appropriate resources are allocated as hosts, the method continues to step 312 where it returns to previous processing, including repeating method 300.

Turning now to FIG. 4, an exemplary system configuration 400 for the decision making engine 402 is disclosed. FIG. 4 illustrates how decision making engine 402 can be incorporated with OPENSTACK technology maintained by the OpenStack Foundation.

The current OPENSTACK cloud architecture supports independent resource placement (i.e. scheduling) decisions internally among its individual components such as Nova, Cinder, and Neutron. For example, the Nova Scheduler 408 presently uses a filter scheduler module 424, which employs a filter/weight based scheduling mechanism, to determine the host for a VM. Examples of criteria considered by this module include available disk space, RAM, CPU cores, etc. Independent from the Nova Scheduler, the Cinder Scheduler 416 uses a similar filtering technique via filter scheduler 424 to designate the physical volumes to be used for block storage. This lack of communication between Nova Scheduler 408 and Cinder Scheduler 416 may result in poor resource allocation. For instance, there is a possibility that the hosts selected for VM and block storage will reside in different physical locations thus resulting in the consumption of excess bandwidth.

Consequently, integrating decision making engine 402 into the OPENSTACK system facilitates a universal resource allocation mechanism that is capable of communicating with the existing OPENSTACK software services. Decision making engine 402 can solve the placement problem by minimizing or maximizing optimization metrics while also satisfying a set of constraints.

Decision making engine 402 works with the current Nova Scheduler 408 and with other modules within the OPENSTACK technology such as Cinder Scheduler 416. The requests to provision VMs or block storage volumes can be routed to decision making engine 402 via the respective solver scheduler 410 or 418.

Decision making engine 402 can take the requests and use constraint module 404 to translate the request into a set of constraints. In addition, the existing filters from filter scheduler module 424 can also be directed to decision making engine 402. The filters can be implemented as constraints and the weights can be used as minimization or maximization cost metrics.

Decision making engine 402 can determine what hosts are available to service the request by communicating with the host manager 412/420 in each of the schedulers. Host manager 412/420 can access its respective host states database 414/422 and report host availability to decision making engine 402.

Decision making engine 402 can use all or part of the information gathered from Nova Scheduler 408, Cinder Scheduler 416, and Filter Scheduler 424 to formulate the necessary equations. These equations can be submitted to constraint solver 406 which will then return a decision map with instance host tuples. The results can be communicated to Nova Scheduler 408 and Cinder Scheduler 416, thus yielding an optimized allocation of network resources.

The architecture of decision making engine 402 can support pluggable solvers, allowing for multiple implementations catering to different scenarios of constraints. Furthermore, constraint solver 406 can consume resources from across services. In some examples, the system may include an additional component that provides a global state repository, and the solver can consume resources from one or all of the OPENSTACK software services that share state information relevant to making resource placement decisions.

Decision making engine 402 provides an intelligent way of scheduling in the OPENSTACK cloud and enables solving the allocation problem while considering complex constraints. These constraints can involve variables from both the local OPENSTACK software service and remote services. In addition, tenants of data centers can have complex business rules and policies that govern data center resources, placing further constraints on allocation decisions. These complex constraints are efficiently handled by decision making engine 402. In some examples, decision making engine 402 can solve the constraint problem by using open source solvers, which have fast C programming language-based implementations that are simple to employ.

One of the constraints considered by the present technology in decision making engine 402 is network distance. Determining the network distance between hosts can be a complicated task. In some examples, network distance between different hosts may be determined based on knowledge of the network topology. However, in some examples, knowledge of the network topology is not available. An example for estimating network distance using IP addresses without relying on the knowledge of the network topology is described in a copending U.S. Provisional Patent Application entitled "IP-ADDRESS BASED NETWORK DISTANCE APPROXIMATION", by Yathiraj B. Udupi, Marc Solanas Tarre, and Xinyuan Huang, which is hereby incorporated by reference in its entirety. The network distance approximation can be used in part for formulating the cost function to be minimized by decision making engine 402.

For clarity of explanation, in some instances the present technology may be presented as including individual functional blocks including functional blocks comprising devices, device components, steps or routines in a method embodied in software, or combinations of hardware and software.

Note that in certain example implementations, the optimization and/or placement functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor, or other similar machine, etc.). The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

It is also important to note that the steps for optimization and/or placement described herein illustrate only some of the possible signaling scenarios and patterns that may be executed by a computing system. Some of these steps may be deleted or removed where appropriate, or these steps may be modified or changed considerably without departing from the scope of the present disclosure. In addition, a number of these steps have been described as being executed concurrently with, or in parallel to, one or more additional operations. However, the timing of these steps may be altered considerably. The preceding operational flows have been offered for purposes of example and discussion.

Although the present disclosure has been described in detail with reference to particular arrangements and configurations, these example configurations and arrangements may be changed significantly without departing from the scope of the present disclosure. For example, although the present disclosure has been described with reference to data centers, it may be applicable to other computing systems and architectures.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A method for allocating resources in a cloud computing environment, the method comprising:
   receiving, by one or more processors, a computing request to instantiate a new virtual machine;
   in response to the computing request, identifying, by the one or more processors, a plurality of physical hosts capable of hosting the new virtual machine;
   for each physical host from the plurality of physical hosts, gathering, by the one or more processors, relevant properties of the physical host from a supply vector corresponding to the physical host, wherein the relevant properties include a location of the physical host within a network topology;
   formulating, by the one or more processors and based on locations of each physical host within the network topology, a cost function establishing a relationship between the physical hosts, the relationship indicating network hop distances between each of the physical hosts; and
   selecting, by the one or more processors and based on the cost function, at least one physical host from the plurality of physical hosts to host the new virtual machine.

2. The method of claim 1, wherein the selecting at least one physical host is performed by the one or more processors to minimize the cost function.

3. The method of claim 1, further comprising:
   converting, by the one or more processors, the computing request into one or more constraints; and
   using, by the one or more processors, a constraint programming solver to select the at least one physical host.

4. The method of claim 1, wherein the computing request includes at least one of a predefined physical host for a portion of memory or a required amount of processing capacity for the new virtual machine.

5. A system comprising:
   one or more computer processors; and
   a memory storing instructions that, when executed by the one or more computer processors, cause the system to:
   receive a computing request to instantiate a new virtual machine;
   in response to the computing request, identify a plurality of physical hosts capable of hosting the new virtual machine;
   for each physical host from the plurality of physical hosts, gather, from a supply vector corresponding to the physical host, relevant properties of the physical host, wherein the relevant properties include a location of the physical host within a network topology;
   formulate, based on locations of each physical host within the network topology, a cost function establishing a relationship between the physical hosts, the relationship indicating network hop distances between each of the physical hosts; and
   select, based on the cost function, at least one physical host from the plurality of physical hosts to host the new virtual machine.

6. The system of claim 5, wherein selecting at least one physical host is performed to minimizes the cost function.

7. The system of claim 5, wherein the instructions further cause the system to:
   convert the computing request into one or more constraints; and
   use a constraint programming solver to select the at least one physical host.

8. The system of claim 5, wherein the computing request includes at least one of a predefined physical host for a portion of memory or a required amount of processing capacity for the new virtual machine.

9. A non-transitory computer-readable medium storing instructions that, when executed by a computing device, cause the computing device to:
   receive a computing request to instantiate a new virtual machine;
   in response to the computing request, identify a plurality of physical hosts capable of hosting the new virtual machine;
   for each physical host from the plurality of physical hosts, gather, from a supply vector corresponding to the physical host, relevant properties of the physical host, wherein the relevant properties include a location of the physical host within a network topology;
   formulate, based on locations of each physical host within the network topology, a cost function establishing a relationship between the physical hosts, the relationship indicating network hop distances between each of the physical hosts; and
   select, based on the cost function, at least one physical host from the plurality of physical hosts to host the new virtual machine.

10. The A non-transitory computer-readable medium of claim 9, wherein selecting at least one physical host is performed to minimizes the cost function.

11. The A non-transitory computer-readable medium of claim 9, wherein the instructions further cause the computing device to:
    convert the computing request into one or more constraints; and
    use a constraint programming solver to select the at least one physical host.

12. The A non-transitory computer-readable medium of claim 9, wherein the computing request includes at least one of a predefined physical host for a portion of memory or a required amount of processing capacity for the new virtual machine.

* * * * *